United States Patent [19]

Helmus et al.

[11] Patent Number: 4,793,183

[45] Date of Patent: Dec. 27, 1988

[54] AUTOMATED POSITIONING/DRAWING SYSTEM AND METHOD OF USE

[75] Inventors: Martin F. Helmus, Philadelphia; Joseph D. Pigott, Jr., Downingtown, both of Pa.

[73] Assignee: Henkels & McCoy, Inc., Blue Bell, Pa.

[21] Appl. No.: 82,884

[22] Filed: Aug. 6, 1987

[51] Int. Cl.[4] .............................................. G01D 9/00
[52] U.S. Cl. ................................... 73/432.1; 346/8
[58] Field of Search ................... 73/432.1, 597; 346/8; 405/174, 175, 180, 181, 183, 184, 159, 164, 160

[56] References Cited

U.S. PATENT DOCUMENTS

| | | | |
|---|---|---|---|
| 1,850,412 | 3/1932 | Pavlik | 405/175 |
| 3,546,887 | 12/1970 | Helmus | 405/180 |
| 3,559,415 | 2/1971 | Vaughan et al. | 405/175 |
| 3,725,919 | 4/1973 | Jones et al. | 346/8 |
| 4,012,918 | 3/1977 | Suzuki et al. | 405/160 |
| 4,070,917 | 6/1978 | Niklas et al. | 73/598 |
| 4,293,238 | 10/1981 | Kuzin et al. | 405/175 |
| 4,492,492 | 1/1985 | Izawa et al. | 405/175 |
| 4,674,768 | 6/1987 | Morca | 280/707 |

FOREIGN PATENT DOCUMENTS

524829 8/1940 United Kingdom ................ 405/160

*Primary Examiner*—Stewart J. Levy
*Assistant Examiner*—Robert R. Raevis
*Attorney, Agent, or Firm*—Caesar, Rivise, Bernstein, Cohen & Pokotilow, Ltd.

[57] ABSTRACT

A position sensing system and method of use in conjunction with a rail car mounted plow burying a cable adjacent the track. The plow is arranged for cutting a kerf in the ground and for inserting the cable therein as the car moves down the track. The plow is mounted on an articulated arm including plural sections which are movable with respect to one another to position the plow at any desired location adjacent the track to cut the kerf and place the cable therein. The position sensing system includes plural transducers including transmitter and receiver sections located with respect to the arm sections to provide signals indicative of the arm section positions with respect to one another and to the ground. The system also includes transducers for providing signals indicative of the position of the plow along the track and signals indicative of the amount of cable dispensed. Recording and translating devices are coupled to the transducers to record those signals and to determine the precise position of cable as buried at selected points along the path. Alarm and display units provide indication of the cable position as it is laid and if the position is not within desired ranges. From the signals indicating the position of the cable at selected points along the path in which it is disposed, one can accurately generate a map showing the cable as laid. That map can be created manually or through computer assisted drawing devices.

35 Claims, 4 Drawing Sheets

AUTOMATED POSITIONING/DRAWING SYSTEM AND METHOD OF USE

BACKGROUND OF THE INVENTION

This invention relates generally to position detection systems and more particularly systems for detecting the position of cable or other elongated continuous flexible materials which are buried in the ground by positionable means carried by a vehicle traversing the ground.

It is common practice to lay telephone or other communications cable along the right of way of a railroad. One particularly effective means for accomplishing that task is a railroad cable laying apparatus like that shown and claimed in U.S. Pat. No. 3,546,887 (Helmus), invented by one of the co-inventors of the subject invention, assigned to the same assignee as this application and whose disclosure is incorporated by reference herein.

The railroad cable laying apparatus disclosed in that patent basically comprises a railroad car adapted to be moved along the track. The car supports a rearwardly trailed elongated arm which can extend laterally from a position on the car to any position to the side thereof so as to draw a blade element through the ground to form a kerf within which continuous flexible material, such as a signal or electrical cable, is deposited by a cable chute also carried by the blade. The arm is an articulated member including plural jointed sections and is positionable by hydraulic components to adjustably locate the blade depositing the cable at selected depths and distances from the railroad track. Release means including a relief valve, check valve and associated hydraulic cylinder are provided to prevent damage to the blade in the event it impacts an object (buried or otherwise) in its path.

After a cable has been laid, whether by the apparatus of the aforementioned patent, or by some other apparatus, it is frequently necessary to service the cable, such as if a breakage occurs. In order to effectuate cable servicing, it is a common practice to provide what are known as "as built" drawings showing the position of the cable as buried. Heretofore, the drawings have been generated by data manually accumulated during the cable laying process. For example, it is a common practice to provide markers adjacent the track at preselected intervals. As the rail car bearing the blade/cable chute passes each marker, the position of the plow with respect to the car and to the ground is measured, manually, e.g., by the insertion of a yardstick or other measuring device into the kerf to determine the depth of the cable while also measuring the distance from the car to the kerf. The data is then recorded either by writing it down or by dictating the readings orally onto magnetic tape.

As will be appreciated, the foregoing means for collecting the data so that an "as built" drawing can be made is not very precise, is labor intensive, is relatively expensive and is not conducive to automated drawing generation.

OBJECTS OF THE INVENTION

Accordingly, it is a general object of the instant invention to provide a system and method for detecting the position of a cable or other elongated flexible member as it is buried and which overcomes the disadvantages of the prior art.

It is still a further object of the instant invention to provide a system and method for automatically deriving data indicative of the position of cable or other elongated flexible member as it is buried by monitoring the position of the means burying the cable so that said data can be used to generate a drawing or map showing the location of the cable.

It is still a further object of the instant invention to provide a system and method for determining the position of a cable or other elongated flexible member as it is buried by movable arm or other support via the use of sensors associated with relatively movable portions of the arm or support.

It is still a further object of the instant invention to provide a system and method for detecting the position of cable or other elongated flexible member as it is buried by monitoring the position of various portions of the movable arm or other support carrying its dispenser and for providing signals indicative of the length of the cable or other elongated flexible member buried and the position thereof to recording means for effecting the production of a drawing showing its position for providing signals to operating personnel for manual control of the dispenser or to automated means for automated control of the dispenser.

SUMMARY OF THE INVENTION

These and other objects of the instant invention are achieved by providing a position sensing system and method for use in conjunction with apparatus for burying an elongated cable or continuous flexible material, e.g., a filament, in an underground path. The apparatus is arranged to cut a kerf in the ground and for inserting the cable therealong as the apparatus traverses the ground along the path. The apparatus comprises ground engaging means to cut the kerf and to introduce the cable into the kerf, and support means to position the ground engaging means at desired positions as the apparatus is moved along the path. The position of each portion of the cable along the path is definable by three cartesian coordinates. The support means comprises plural sections which are movable relative to one another to establish the positions for the cable along the path. The position sensing system comprises sensor means coupled to the plural sections of the support means to detect the position thereof and means responsive to the sensor means for providing at least one signal indicative of the position of at least one of the sections with respect to at least another of the sections at selected points along the path as the apparatus traverses the path, whereupon the position of the cable at the selected points can be determined therefrom.

DESCRIPTION OF THE DRAWING

Other objects and many of the attendant advantages of the subject invention will be readily appreciated as the same becomes better understood by reference to the following detailed description when considered in connection with the accompanying drawing wherein.

DETAILED DESCRIPTION OF THE PREFERRED EMBODIMENT

Referring now to various figures of the drawing wherein like reference characters refer to like parts, there is shown at 20 a position sensing system for use in conjunction with apparatus 22 for burying elongated cable in an underground path. The overall system is shown clearly in FIGS. 1A and 1B.

The apparatus 22 is of conventional construction and many of its details will be described later. Suffice it for now to state that the apparatus 22 basically comprises a rail car 24 on which a pair of articulated arms 26 (only one of which can be seen) are mounted. The arms are arranged to extend from either side of the car beside the railroad track 28. Each arm is made up of a plurality of interconnected sections which are connected to one another and arranged to be moved relative to one another. In the embodiment shown herein, the arm comprises three sections, 26A, 26B and 26C. At the free end of section 26C is a conventional plow blade 30 for cutting a kerf (not shown) or slot in the ground 32. The trailing portion of the blade 30 includes cable laying means 34 to introduce a continuous flexible cable 36 from a supply reel (not shown) on the car so that the cable is extended and disposed along the kerf as it is cut by the blade as the car moves down the track in the direction of arrow 38 in FIG. 1B. The cable introduction means basically comprises a cable chute 34A whose lower free end is open and which is located at a fixed position adjacent the bottom of the blade 30. The blade 30 includes a cutting edge 30A located on the leading edge at the bottom of the blade. The position of the free end of the cable chute 34A from the blade portion 30 is fixed.

The position sensing system 20 is arranged to determine the precise position of the blade, and hence the cable 36 introduced by the chute mounted thereon at predetermined intervals along the track as the kerf is cut and the cable introduced. To that end, the position sensing means utilizes a plurality of transducers (to be described later) including sensors coupled to portions of the arm to determine the position and orientation of the arm with respect to the ground. Signals bearing the information from the sensors are provided to control and display means (to be described later). Those signals, plus signals indicating the length of cable which has been inserted into the kerf, as well as signals indicating the amount of movement of the rail car along the track and the direction thereof, are provided to data recorder means (to be described later). The signals are also used to provide alarms and visual displays for the personnel laying the cable. The data recorder means serves to record the position of the cable at the predetermined intervals along the track. This information can be stored on floppy diskette or other auxiliary storage means and can be utilized to automatically plot a map or make a drawing showing the precise position of the cable along the track.

The arm 26 basically comprises the heretofore identified sections 26A, 26B and 26C, adjacent ones of which are connected together at respective joints. This construction enables the movement, e.g., pivoting, swiveling, rotation, of one arm section with respect to the immediately adjacent section so that the blade, and hence the cable chute 34A, can be positioned at any point within a volume or envelope extending outward from the side of the vehicle carrying the plow arm. In particular, the blade can be positioned a desired distance out from the side of the rail car (in the embodiment disclosed herein) and a desired distance below the are, and hence into the ground, to cut the kerf and insert a cable therein as the car moves along the track.

The actual positioning of the arm is effected via the use of respective hydraulic cylinders. Thus, a respective cylinder is provided for each movable joint, with the cylinder housing being secured to one section of the arm at the joint and with the piston end of the cylinder connected, via a turnbuckle, to the associated section of the arm at the joint. With the foregoing arrangement, the amount of extension of the piston rod establishes the geometry of the joint and the two connected arm sections with respect to each other.

Figure 1A:
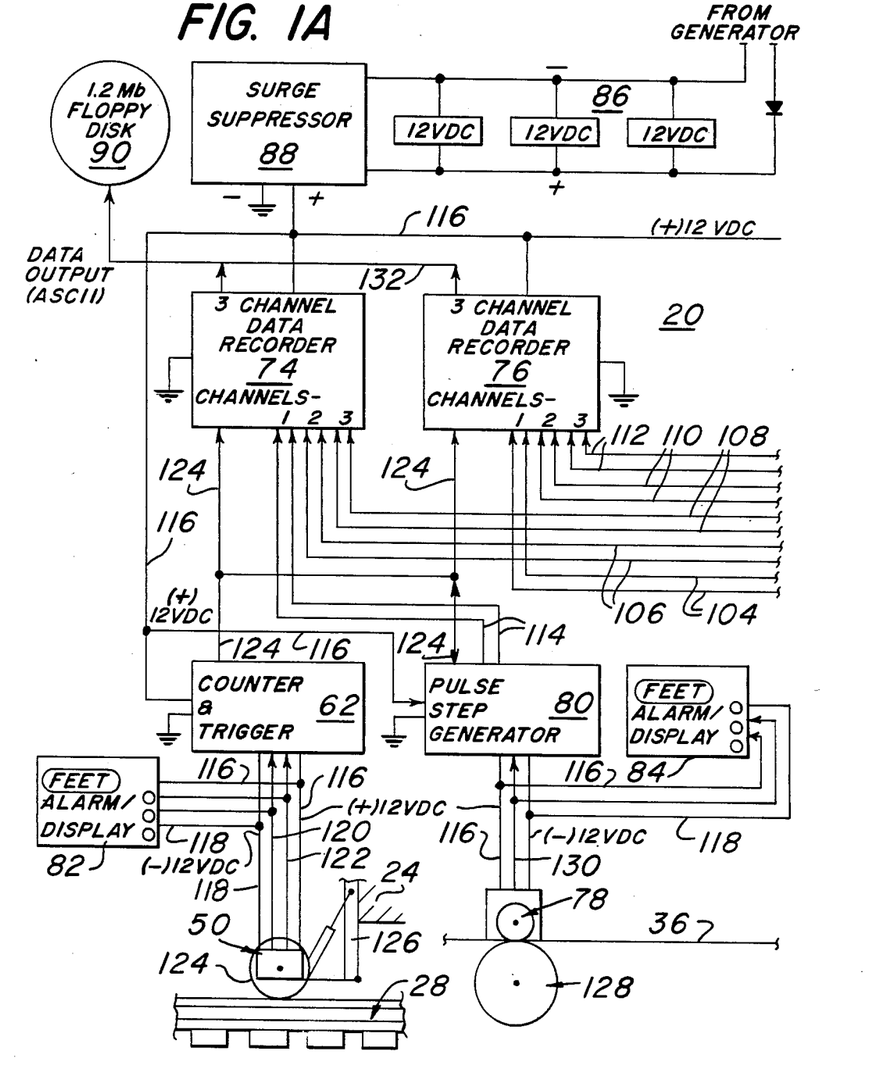
FIG. 1, composed of FIGS. 1A and 1B, constitutes a functional block diagram and partial schematic diagram of the position detection system of the subject invention used with a rail car mounted, arm supported plow, in a typical cable laying application.
Figure 1B:
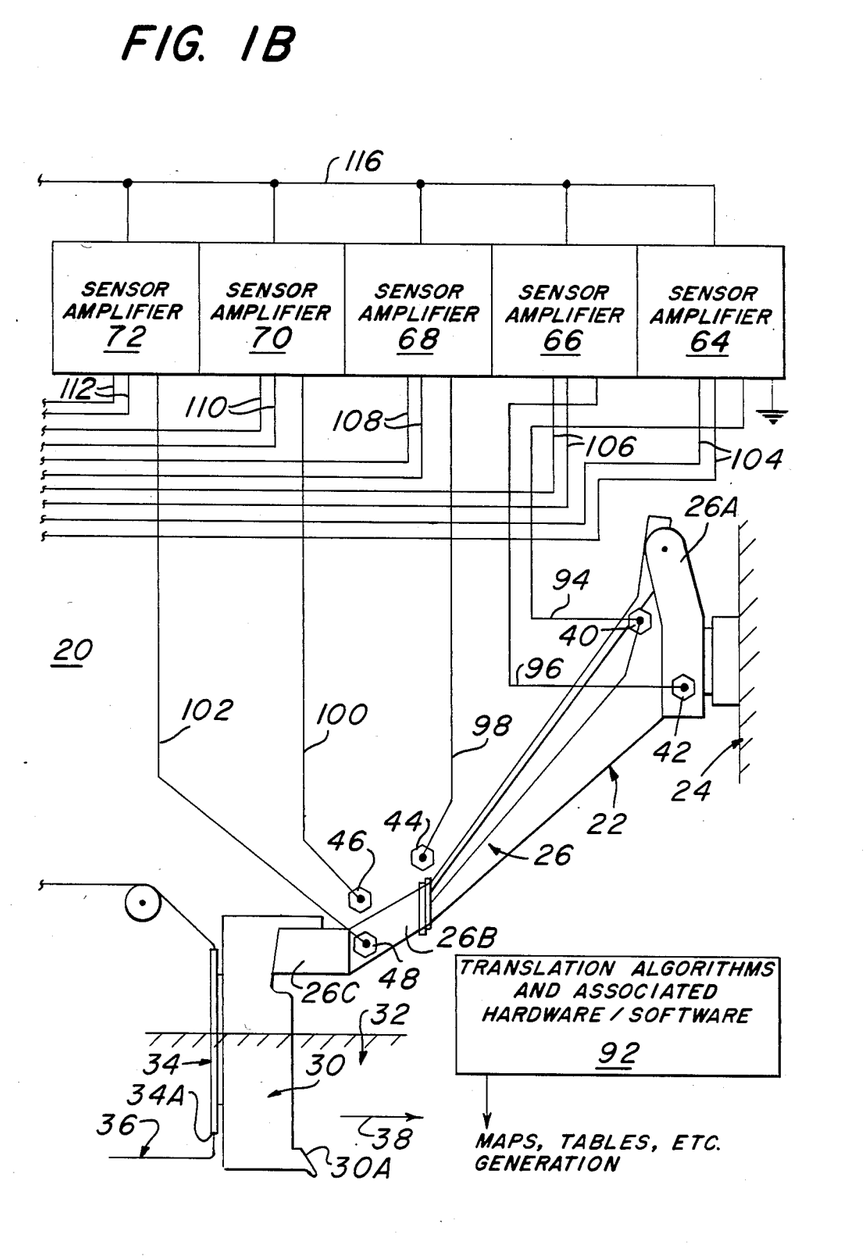

As be clearly in FIG. 1B, the embodiment of system 20 showing herein includes fine proximity transducers which are mounted on the arm at predetermined positions. In particular, the proximity transducers are mounted on respective cylinders in order to determine the amount of extension of the associated piston rod and for providing signals indicative thereof. These signals thus carry data which is utilized to compute or calculate the position of the cable as it is laid from the cable chute. Four of the transducers, i.e., those identified by the reference numerals 40, 42, 44 and 46, are mounted on arm and are arranged to provide signals representative of the position of their associate arm sections with respect to each other. The fifth proximity transducer, identified by the reference numeral 48, is also mounted on the arm, but adjacent the blade 30. This transducer is arranged to provide a signal indicative of the distance of its associated arm section to the ground. The signals from the five transducers thus represent data from which the Y coordinate (i.e., distance to the track) and the Z coordinate (i.e., distance below the track) can be calculated. The system 20 also includes distance measuring means 50 arranged to provide signals indicative of the distance that the rail car has moved on the track 28 (that is, the X coordinate). Thus, the signals from the transducers represent data from which the X, Y and X (cartesian coordinates) of the cable chute can be readily calculated. These signals bearing the cable chute position data are provided to counter and trigger means 62, to be described later, to provide a trigger signal whenever the car has traveled a predetermined distance along the track and to provide direction signals indicating the direction of travel along the track. The cable chute position signals from the aforementioned five transducers are provided to respective amplifier means 64, 66, 68, 70 and 72 and from those means to means for recording the amplified signals. In particular, the recording means comprises a pair of data recorders 74 and 76. Any suitable data recorder can be utilized. One particularly effective unit is sold by M. C. Miller Company of Ringwood, N.J. under the designation Tricorder.

The trigger signals from the counter and trigger means 62 are provided to the two data recorders 74 and 76 to cause the recorders to record the arm position input data from the proximity transducers of the arm. Thus, the system 20 records the cable chute position signals at predetermined points (i.e., preestablished intervals) along the path of movement of the rail car down the track.

The system 20 also includes means 78 for measuring the length of cable which has been dispensed, that is, reeled off the supply reel, into the kerf during the cable laying process and for providing signals indicative thereof, via a pulse step generator 80, to another input to one of the data recorders.

Alarm and display means 82 are provided in the system coupled to the distance measuring means 50 to provide the operating personnel with a visual, e.g., digital, display of the distance that the car has traveled and to also provide visual and/or audible alarm signals indicating when the car has traveled a predetermined distance. Similar display and alarm means 84 is coupled to the cable length measuring means 78 to provide a visual display of the length of cable laid and to provide visual and/or audible alarm signals.

The requisite power for the system 20 is provided from the rail car's generator (not shown) by a regulated 12 VDC power supply 86 and associated surge suppressor 88. The system 20 also includes plural 12 volt back-up batteries (not shown) which are kept charged by the generator for powering the system 20 in case of a power failure.

The data recorders 74 and 76 are arranged to provide digital output signals, preferably in ASCII format, to a floppy disk drive 90, where the signals are stored on disk for subsequent use.

In accordance with the preferred embodiment of this invention, the digital output signals (e.g., the data stored on the floppy disk) is arranged to be input into associated translation means 92. That means includes both hardware (e.g., a computer) and software and/or firmware (not shown). The software/firmware is composed of translational algorithms and other algorithms to convert the data into digital signals indicative of the precise position of the cable at the measured points along the path. The data also includes information representing the depth of the cable below the grade, that is, the depth in the ground.

It should be pointed out a this juncture that the specific algorithms utilized in the means 92 is dependent on the specific geometry of the arm, the position of the transducers thereon, etc., and can be readily ascertained or established by those skilled in the art. Thus, those algorithms will not be included herein in the interest of brevity.

The data provided by the means 9 in defining the cable position by its X, Y and Z (cartesian) coordinates is suitable for use by any suitable computer assisted drawing programs, such as that sold under the Trademark AUTOCAD. Accordingly, computer assisted drawings of the "as built" cable position along the track can be readily accomplished. These drawings may consist of a plan view showing the X and Y coordinates, an elevation or profile view showing the X and Z coordinates, or any other desired view, e.g., a perspective view. Obviously, the data produced by the system 20 can also be used for manually making "as built" drawings and/or tables.

It should be pointed out at this juncture that the system 20 may, if desired, be configured as a closed loop or feedback system. In such a case, means (not shown) are provided to control the position of the arm 26, via the control of various cylinders, eetc., to maintain the blade at a desired position in the ground along the rail as the car moves therealong and in response to the measured output signals from the proximity sensors. Moreover, the signals indicating the position of the blade can be used to provide the operator with that information via the use of additional indicators and/or display devices (not shown). Thus, the operator can effect accurate manual control of blade position by viewing the display of the blade and its coordinates, or in some graphical manner, depending on the hardware/software used to create the display.

It should also be pointed out at this juncture that the subject system 20 is not limited to use with rail-based systems for laying cable. Hence, any system for traversing the ground and/or water with a movable arm or armature supporting a cable laying device thereon and whose position can be determined by determining the relative position of its component parts with respect to one another and with respect to the carrying vehicle is embraced within the scope of this invention. In fact, the subject invention is not limited to use for laying cable but can be used in any system wherein it is desired to record information indicating the position of a member moving through a path in the ground.

The detailed description of the construction of the system shown in FIGS. 1A and 1B will now be described and thereafter its operation discussed. The transducers 40, 42, 44, 46 and 48 are connected to respective sensor amplifiers 64, 66, 68, 70 and 72 via respective electrical conductors 94, 96, 98, 100 and 102. The proximity sensors 40, 42, 44, 46 and 48 are each a conventional ultrasonic device such as sold by Honeywell Microswitch under the model designation 942, and including a transducer having a transmitter portion and a receiver portion. The transmitter portion directs an acoustic signal to a target (to be described later). The transducer then switches its mode of operation so that its receiver portion measures the time interval it takes the acoustic signal to be bounced back from the target. The transducer then provides an analog output signal indicative of the distance between the sensor and the target as determined by the time delay (interval). Other types of proximity sensors can be utilized in lieu of the ultrasonic transducers described heretofore. Thus, the proximity detecting devices can be laser devices, magnetic devices, photoelectric devices, etc.

As mentioned earlier, each of the proximity transducers 40, 42, 44 and 46 is mounted on the cylinder housing of the respective hydraulic cylinders for effecting the movement of the arm sections 26A, 26B and 26C with respect to one another. As will be described in detail later, each cylinder is secured either stationarily or pivotably to its associated arm section while the turnbuckle at the free end of its associated piston arm is pivotably secured to the immediately adjacent arm section. The target for each transducer is fixedly mounted on the turnbuckle of the associated cylinder's piston rod so that the target is always disposed aligned with the transmitter/receiver irrespective of the orientation of the arm.

The proximity transducer 48 is of the same type as transducers 40–46 but is fixedly mounted directly on the arm section 26B. That transducer includes deflecting means to be described later to deflect the acoustic signal downward down to the ground, and to bounce the reflected signal back to the transducer.

The transducers 40–48 provide respective analog output signals, e.g., zero to ten volts, via their conductors 94–102, respectively, to respective sensor amplifiers 64–72. Each sensor amplifier includes a pair of output lines to provide the amplified analog signals indicative of the associated arm section position to the data recorders 74 and 76. Each data recorder is a three channel, input device. Thus, the two output lines 104 of sensor amplifier 64 are connected as a first input channel to the data recorder 76. The two output lines 106 of sensor amplifier 66 are connected at the second input channel of the other data recorder 74. The two output lines 108 of sensor amplifier 68 are connected to the third input channel of the data recorder 74. The two output lines 110 of the sensor amplifier 70 are connected to the second input channel of the data recorder 76, and the two output lines 112 of the sensor amplifier 72 are connected to the third input channel of the data recorder 76. The first input channel of the data recorder 74 is provided via a pair of input lines 114, which are connected to the output of the pulse step generator 80.

Power is provided from the 12 volt DC power supply 86 and the associated surge suppressor 88 via the (+)12 VDC bus, identified by the reference numeral 116. The (−)12 VDC bus is denoted by the reference numeral 118. These two buses carry the system power to the various components as shown in FIGS. 1A and 1B.

The counter and trigger means 62 includes two input lines 120 and 122, each of which is connected to a respective output of the distance measuring means 50 (to be described hereinafter). The line 120 serves to carry signals indicating the distance that the car 24 has moved along the track 28, while the line 122 serves to carry the signals indicating the direction of movement of the car.

The distance measuring means 50 basically comprises a wheel 24 mounted on an extendable bracket 126 on the car 124 so that the wheel engages to roll along the top of one of the rails of the track 28. The means 50 also includes a distance/direction encoder (to be described later) whose rotary input shaft is coupled to the wheel 124 and is arranged to provide outputs on two channels, i.e., lines 120 and 122, respectively, described heretofore. In particular, the encoder provides a pulse train on line 120. The pulse train consists of a series of constant width square waves produced upon the rotation of the wheel 124. The circumference of the wheel 124 is selected and the output of the distance/direction encoder is set so that a predetermined number of square waves are provided for each rotation of the wheel (e.g., forty-eight (48) square waves for each rotation and with each rotation representing the movement of the car of one foot). The signal appearing on the encoder's second channel, that is, line 122 is either a "high" or "low" signal indicating the direction of rotation of the wheel 124, e.g., a high signal for rotation in the forward (clockwise) direction and a low signal for movement in the reverse (counter clockwise) direction, or vice versa.

In accordance with the preferred embodiment of the invention, the encoder is any conventional device, such as that sold by Encoder Products Company of Sandpoint, Id., under the model designation Accu-coder 715-2.

The two lines 120 and 122 carrying the distance and direction information from the distance/direction encoder are also connected as inputs to the alarm/display unit 82. That unit basically comprises a conventional device including a totalizer to count the pulses provided via line 120 and to convert the counted pulses into a digital display on an LCD panel of the distance, e.g., feet, that the car 24 has traveled down the track. In addition, the alarm/display 82 includes a programmable means so that it can be set up to provide an alarm whenever the count reaches a predetermined point, e.g., whenever the car has traversed a predetermined distance or interval on the track. This alarm is used to aid the operating personnel. In addition, the unit 82 is arranged to provide alarm signals upon the existence of other conditions (e.g., the amount of data recorded in the associated data record has reached a predetermined portion, e.g., 95%, of is capacity.

In cable laying applications wherein the vehicle supporting the arm comprises a car for rolling along a track, like the disclosed embodiment herein, the wheel 124 is preferably formed of a ferromagnetic material to ensure that the wheel rolls along the track without slippage, which action could decrease the accuracy of the system.

The counter and trigger circuit 62 includes an output line 124 which is connected as an input to both of the data recorders 74 and 76 and also has an input to the pulse step generator 80.

In accordance with the preferred embodiment of the invention, the counter and trigger circuit includes means for counting and storing the pulses appearing on line 120 from the distance/direction encoder of means 50. Once a pre-selected count is reached, i.e., the car has traveled a predetermined distance, the counter and trigger means 62 provides a trigger signal on line 124. This signal acts as a "record enable" signal to enable the two data recorders 74 and 76 to record the data appearing on their respective input channels. For example, if data is desired to be recorded at five foot intervals along the track, the counter and trigger circuit means is adjusted to provide a trigger signal, that is, a pulse, on line 24 upon the receipt of the 240th (5×48) pulse from the distance/direction encoder of means 50. In addition, the counter and trigger means 62 also passes on the high or low signal from line 122, indicating the direction of motion of car along the track, to the two data recorders for storage therein. Thus, each time the car has moved a predetermined distance, e.g., five feet, the two data recorders record all of the input data indicative of arm position, the fact that the car has moved another predetermined distance along the track, and the direction of movement therealong.

As noted earlier, the trigger output signal from the counter and trigger 62 is also provided as an input to the pulse step generator 80. That signal is provided for reasons to be described shortly.

The dispensed cable measuring means 78 includes an encoder of the same type as used in the distance measuring means 50. Thus, the encoder in means 78, and now referred to as the cable length encoder is coupled to a wheeled assembly 128. That assembly includes plural adjustable wheels between which the cable being unreeled into the kerf passes. One of the wheels is connected to the rotary input shaft of the cable length encoder. Accordingly, the movement of the cable 36 through the wheeled assembly 128 causes the rotation of the rotary input shaft of the cable length encoder. Since the cable 36 will only be reeled out in direction, the cable length encoder, while capable of providing two outputs, only needs to provide the pulse train output indicative of the length of cable that has passed thereby. This signal is provided on the encoder's output channel line 130 as a second input to the pulse step generator 80. In the interest of component compatibility and substitutability, the cable length encoder is adjusted and the wheeled assembly constructed so that for each rotation of the wheel which engages the cable, one foot of cable will have been dispensed add the cable length encoder would have produced a string of forty-eight (48) pulses.

The pulses appearing on line 130 are provided as an input to the alarm/display unit 84. That unit is similar to unit 82 and serves to produce a visual display of the length of cable dispensed. In addition, the means 84 can be programmed to provide an audible alarm or display whenever a predetermined length of cable has been dispensed and for any other reason, e.g., when the data in the recorders has reached a predetermined portion, e.g. 95%, of the capacity of the associated data recorder.

The pulse step generator 80 is arranged to provide an analog output signal on its pair of output lines 114 to the first input channel of the data recorder 74. That analog signal represents the amount of cable which has been dispensed and is incremented upon receipt of each pulse, via line 130, from the cable length encoder. As noted earlier, another input to the pulse step generator 80 is provided, via line 124, from the counter and trigger means 62 and carries the trigger signal which is produced each time that the car 24 has traversed a predetermined distance along the track. The trigger signal provided to the pulse step generator serves two functions, namely, it causes the pulse step generator to maintain the last analog output value for a sufficiently long period of time so that the data recorder is able to record it and thereafter it resets the analog voltage appearing on its output lines 114 to zero to prevent overdriving of the first input channel to the data recorder 74. The pulse step generator 80 also includes means to provide a trigger signal to the data recorders to record the information appearing at their inputs in the event that the length of cable unreeled is such that it reaches the capacity of the pulse step generator or the data recorder's resolution. The step generator is then reset and operation commences anew.

The respective outputs of the two data recorders 74 and 76 are in the form of digital signals which are provided on a data bus 132. The data bus is thus connected to the outputs of those data recorders. The digital signals are carried by the data bus to the floppy disk drive 90 where they are recorded on a floppy disk (not shown) located in the drive. The recorded signals are then available for use by the translation means 92 and any associated hardware/software (not shown) to produce a drawing, map, table, etc., as described heretofore.

Figure 2:
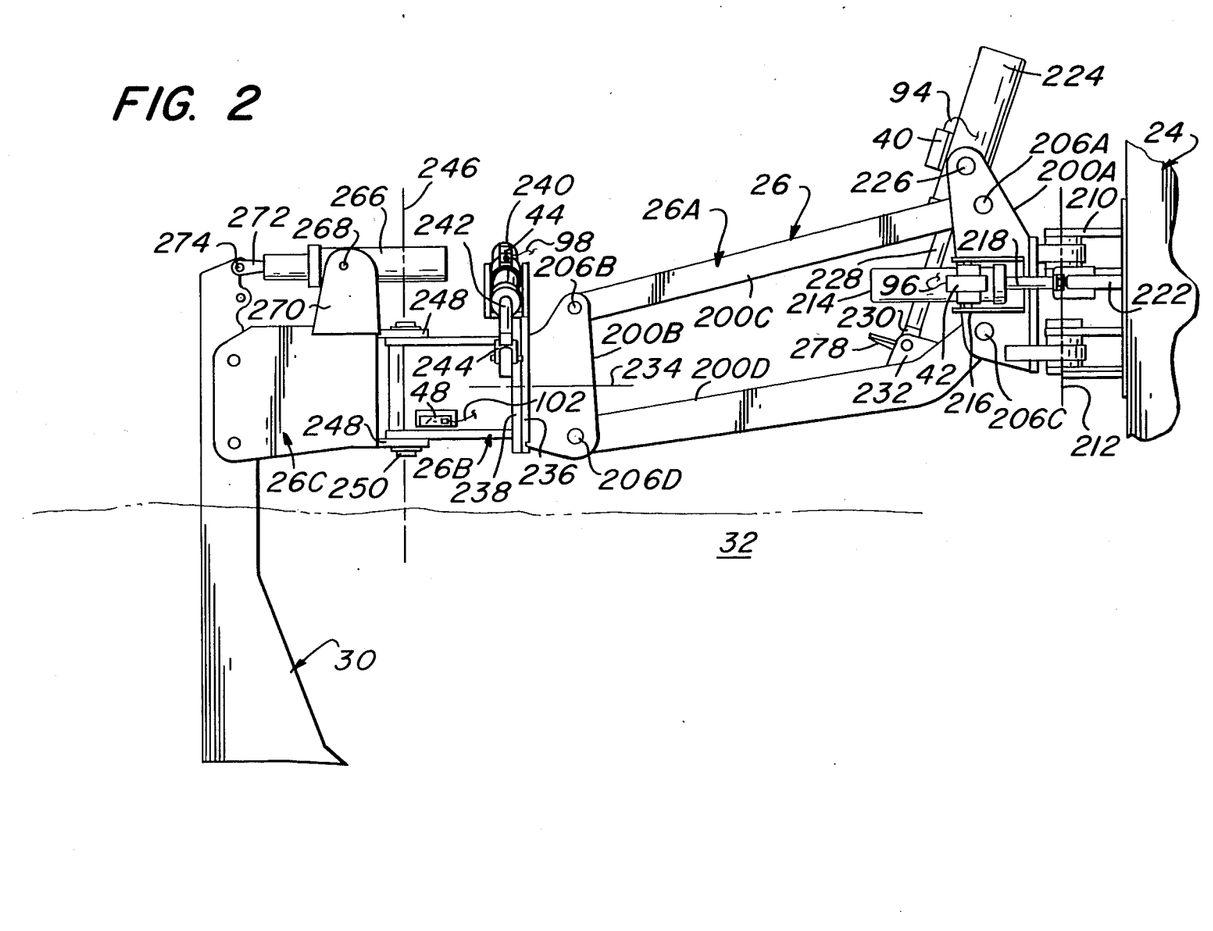
FIG. 2 is a side elevational view of the arm utilized to plow the ground to insert the cable therein and on which a portion of the position sensing system of FIG. 1 is mounted.

Referring now to FIG. 2, a typical arm in which a plow blade is mounted is shown. The arm can be of any construction. As discussed earlier, the embodiment of the arm 26 shown herein basically includes three sections 26A, 26B and 26C. The first section 26A basically comprises a framelike construction formed of four pairs of pivotably interconnected components, namely, a first end member 200A, a second end member 200B and a pair of links 200C and 200D. The members are connected to one another via respective pivot pins, to be described later, so as to form a parallelogram assembly to enable the blade 30 of the arm to be held in an orientation so that it is directed parallel to the X axis (e.g., the track) but may be tilted from the vertical (i.e., the Z axis). The section 26A is pivotably mounted to the side of the rail car 24, via a yoke and pivot assembly 210, to enable the entire arm 26 to be pivoted about vertical axis 212 either outward (away) from the car for plowing operations or inward (back to) the car for stowage of the arm. The means for effecting the pivoting of the arm 26 about the axis 212 basically comprises a hydraulic cylinder 214, whose housing is pivotably mounted via a bracket and pivot pin 216, to the end member 200A of section 26A. The cylinder includes a piston rod 218 which terminates at its free end in a turnbuckle 220. The turnbuckle is pivotably secured to a bracket 222 mounted on the yoke/pivot assembly 210. Thus, upon the retraction of the piston arm into the cylinder, the arm 26 is rotated about axis 212 in the counterclockwise direction as viewed in FIG. 3, whereas the extension of the piston rod outward causes the rotation of the arm about that axis in clockwise direction.

As can be seen in FIG. 2, one upper link 200C of arm section 26A is interconnected between the members 200A and 200B. To that end, the proximal end of link 200C is connected via a pivot pin 206A to an upper portion of the member 200A. The distal end of that link 200C is connected to the upper portion of the end member 200B, via a pivot pin 206B. In a similar manner, the proximal end of link 200D is connected to a lower portion of the end member 200A, via a pivot pin 206C, while the distal end of that link is connected to the lower portion of the end member 200B, via pivot pin 206D. The spacing between the pins 206A and 206C is the same as between 206B and 206C while the spacing between pins 206A and 206B is the same as the spacing between pins 206C and 206D. Accordingly, the portion 200B can be moved in a vertical direction parallel to axis 212 by the swinging action of the two arm links 200C and 200D.

The means for effecting the parallelogram movement of the arm section 26 comprises another hydraulic cylinder 224. The cylinder 224 is pivotably mounted via a pin 226 to a flanged portion of one of the end members 200A. The piston rod 228 of the cylinder terminates at its free end in a turnbuckle 230 which is pivotably secured to a bracket 232 on the associated link 200D. Accordingly, upon the retraction of the piston rod 228 toward the cylinder, the links 200C and 200D will be pivoted upward about their respective pivot pins 206A and 206C to cause the end members 200B of section 26C to move upward vertically. Conversely, the extension of pivot rod 220A from the cylinder causes downward pivoting of the links and the corresponding downward vertical movement of section 200B.

The second section 26B of arm 26 is connected to the section 26A. The arm section 26B is a frame like member which is arranged to be rotated about a horizontal axis 234 extending through the joint connecting the two sections 26A and 26B. Thus, the free end of arm section 26A (i.e., end member 200B) includes a rotative coupling 236 which cooperates with a rotative coupling 238 forming a portion of the second arm section 26B. The means for effecting the rotation of section 26B with respect to arm section 26A and about axis 234 comprises a third hydraulic cylinder 240. The cylinder 240 is secured, via a flange (not shown), on the coupling end 236 of arm section 26B. The piston rod 242 of the cylinder 240 terminates in that its free end in a turnbuckle 244 which is pivotably connected to the coupling 238. Accordingly, the extension and retraction of the piston rod 242 causes the arm section 200 to rotate either clockwise or counter clockwise about axis 234.

Figures 3, 4, 5:
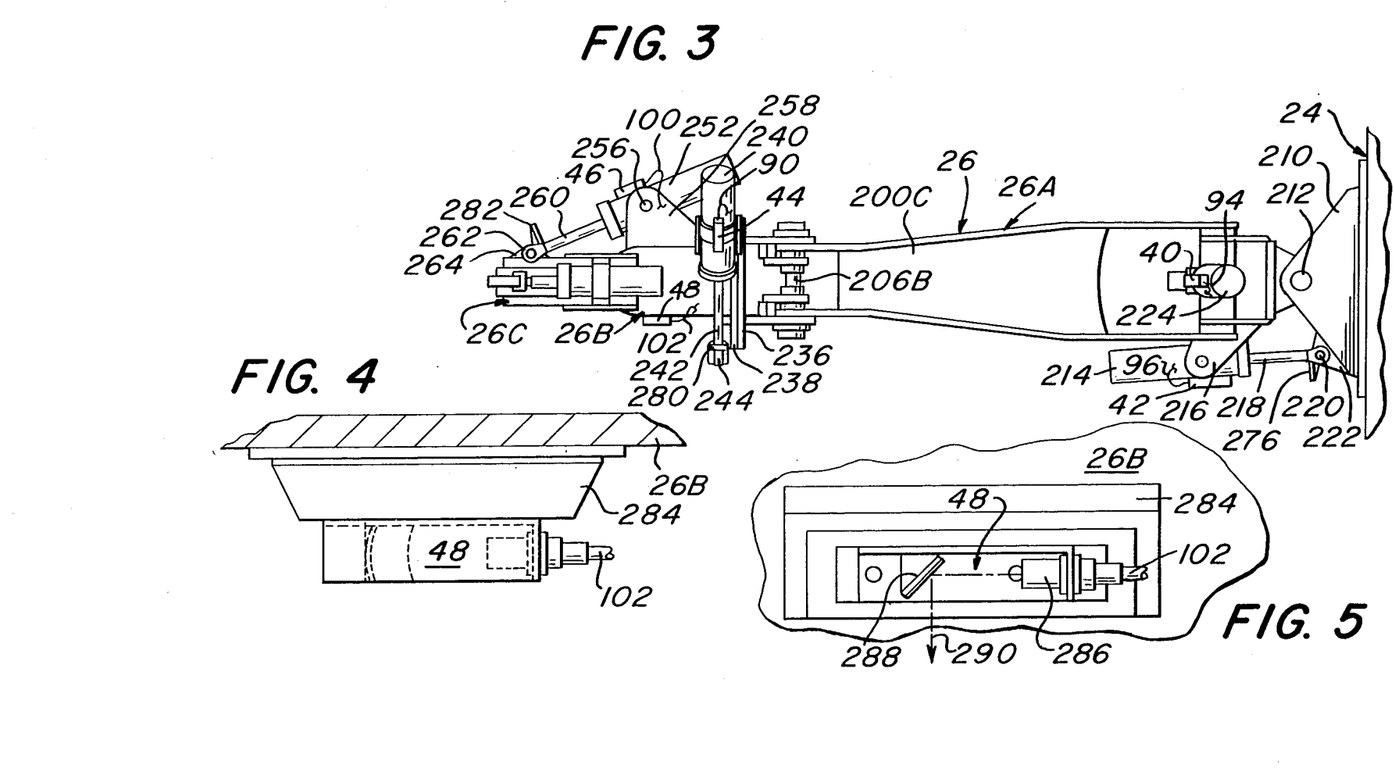
FIG. 3 is a plan view of the arm shown in FIG. 2.
FIG. 4 is an enlarged view, partially in section, of a portion of one section of the arm shown in FIGS. 2 and 3.
FIG. 5 is a side elevational view of the portion of the arm shown in FIG. 4.

The third arm section 26C is a framelike member which is pivotably connected to arm section 26B so that it can pivot with respect thereto about an axis 246. The arm section 26C comprises a pair of horizontally projecting ears 248 through which a pair of aligned pivot pins 250 extend. A pivot pin passes through aligned holes in the frame section 26B. As can be seen in FIG. 3, the means for effecting the pivoting of section 26C about axis 246 comprises a fourth hydraulic cylinder 252. The cylinder 252 is pivotably mounted, via a pivot pin 256 extending through a bracket 258 on arm section 26B. The piston rod 260 of cylinder 252 includes a turnbuckle 262 at its free end which is pivotably connected to a bracket 264 on arm section 26C. As will thus be appreciated, upon the extension of piston rod 260 from cylinder, the arm section 204 pivots about axis 246 in the counter clockwise direction as shown in FIG. 3 and upon retraction of the piston arm toward the cylinder pivots about that axis in the clockwise direction.

The arm section 26C serves as the mount for the plow blade 30 and the associated cable chute 34. The blade 30 is arranged to be pivoted about a horizontal axis with respect to arm section 206 to orient the blade in a plowing position. To that arm, the end section 26C includes a sixth hydraulic cylinder 266 which is pivotably mounted via a pin 268 to a bracket 270 on the arm section. The piston rod 272 of the cylinder includes a free end 274 which pivotably connects it to the upper end of the plow blade 30. As will be appreciated, upon the extension of the piston rod 272, the plow blade will be pivoted in the counter clockwise direction as shown in FIG. 2 and upon the retraction of the piston rod will be pivoted in the clockwise direction. The cylinder 266 is a double acting cylinder which forms a portion of a blade release mechanism like that described in the aforementioned U.S. Pat. No. 3,546,887 and cooperates with a relief valve (not shown). The cylinder is arranged to locate the blade 30 in a substantially upright, operative position, that is, parallel to axis 212. Also included with the blade release means is a check valve (not shown). The check valve, relief valve and hydraulic cylinder 266 cooperate so that upon the blade encountering an obstruction in the ground while cutting the kerf, it may tilt or rotate rearwardly and upwardly. The relief valve is operable at a selected pressure to exhaust fluid in a metered manner from the cylinder 266 upon contact of the blade with the obstruction. This action prevents damage to the blade.

As will be appreciated by those skilled in the art, the cylinder 252 effects the steering of the blade, that is, it enables the blade to follow the desired path along the track and to steer around any obstruction that has been sighted by the operating personnel. If the steering action cannot result in the avoidance of the obstruction and the operator does not have sufficient time to lift the arm to cause the blade to avoid the obstruction, the blade release means will prevent any damage to the blade.

As discussed earlier, the arm position sensing proximity transducers 40–46 are mounted on associated hydraulic cylinders with their targets mounted on the turnbuckle located on the piston arm of the associated cylinder. In this connection, as can be seen clearly in FIGS. 2 and 3, the proximity transducer 42 is fixedly mounted onto the housing of hydraulic cylinder 214. The target, in the form of a metal plate 276, is mounted on the turnbuckle opposite to the transducer 42 so that there is a clear line of sight maintained irrespective of the orientation of the arm. In a similar manner, the transducer 40 is mounted on the cylinder housing 224 while its target 278 is mounted on the turnbuckle 230 of piston rod 228 so that it is always in a line of sight to the transducer. So, too, the transducer 44 is mounted on the housing of cylinder 240 and its target plate 280 is mounted on the turnbuckle 244 located at the end of the piston rod 242 in a direct line of sight. Finally, the transducer 46 is mounted on the housing of cylinder 252 while its target plate 282 is mounted on turnbuckle 262 at the end of piston rod 260 in a direct line of sight.

The ground distance sensing proximity transducer 48 is mounted on the member making up the arm section 26B as shown clearly in FIGS. 2, 4 and 5. In particular, the transducer is mounted via a bracket 284 onto that section. The transducer, like the transducers 40–46, includes the ultrasonic transmitter/receiver, now designated by the reference numeral 286 so that it extends generally horizontally. However, unlike transducers 40–46, disposed opposite the emitting end of the transmitter/receiver 286 of transducer 48 is a reflector plate 288. This plate is angled at a 45° angle to the direction of the acoustic (ultrasonic) waves exiting from the transmitter/receiver so that the waves are directed downward to the ground in the direction of arrow 290. The reflected waves from the ground then bounce off the angled plate 288 for receipt by the receiver portion of transmitter/receiver 286.

As noted earlier, and as will be appreciated by those skilled in the art, with the geometry of the arm and its various linkages known, one can readily derive translational equations to describe the movement of the arm based on the amount of extension or retraction of each of its actuating cylinders. Those equations are preferably maintained in the heretofore identified unit 92. That unit preferably comprises a computer, such as sold by International Business Machines, Inc., under the designation PC-AT, or any compatible computer.

The translation equations or algorithms may also be stored in means (not shown) comprising a portion of the system 22 and mounted on the car 24 so that automated or servo control of the plowing operation can be effected, or for providing information to the operating personnel regarding the position of the plow, and the amount of cable dispensed so that the operator can effect plowing under manual control.

Without further elaboration, the foregoing will so fully illustrate our invention that others may, by applying current or future knowledge, adopt the same for use under various conditions of service.

What is claimed is:

1. A position sensing system for use in conjunction with apparatus for burying an elongated flexible member in an underground path, said apparatus being arranged for cutting a kerf in the ground and for inserting said flexible member therealong as said apparatus traverses a first above ground path adjacent said underground path, said apparatus comprising ground engaging means to cut said kerf and to introduce said flexible member into said kerf, and support means to position said ground engaging means at desired positions as said apparatus is moved along said first path, the position of each portion of said flexible member along said underground path being definable by first, second, and third coordinates representative of the distance along the first path, the lateral distance from said first path, and the depth below said first path, respectively, said support means comprising at least two sections which are movable relative to one another to establish the position of the flexible member in said under ground path, said positioning sensing system comprising first measuring means to provide first signals indicative of the distance traveled by said apparatus along said first path, sensor means coupled to said at least two sections of said support means to detect the position thereof, first means responsive to said sensor means for providing support position signals indicative of the position of at least one of said sections with respect to at least another of said sections at selected longitudinal points along said first path as said apparatus traverses said first path and second means responsive to said first means for providing second and third signals, representative of said second and third coordinates, respectively, at each of said selected points.

2. The position sensing system of claim 1 additionally comprising means for recording said support position signals.

3. The position sensing system of claim 2 wherein said apparatus comprises a car arranged to roll along said first path and wherein said support means comprises an arm mounted on said car and comprising said at least two sections, and wherein said ground engaging means comprises a plow blade mounted on said arm.

4. The position sensing system of claim 3 wherein said car is a railroad car.

5. The position sensing system of claim 1 wherein said first measuring means comprises a wheel for rolling along said first path and first encoder means coupled to said wheel to provide the signal indicative of the position of said apparatus along said first path.

6. The position sensing system of claim 5 wherein said apparatus comprises a rail car for rolling along a track and wherein said wheel is arranged to engage a rail of said track to roll therealong.

7. The position sensing system of claim 6 wherein said wheel is ferromagnetic.

8. The position sensing system of claim 5 comprising trigger signal producing means responsive to said first encoder means and recorder mans, said recorder means being adapted to record said signals from said sensor means upon the occurrence of said trigger signal.

9. The position sensing system of claim 8 wherein said trigger signal producing means additionally comprises counting means to count said signals provided by said first encoder means and to provide said trigger signal when the count reaches a predetermined value corresponding to the spacing between said selected points in said path.

10. The position sensing system of claim 1 wherein said apparatus comprises a car arranged to roll along first said path and wherein said support means comprises an arm mounted on said car and comprising said at least two sections, and wherein said ground engaging means comprises a plow blade mounted on said arm.

11. The position sensing system of claim 10 wherein said car is a railroad car and wherein said first path is one of the rails of the railroad tracks on which said car is located.

12. The position sensing system of claim 11 wherein said distance measuring means comprises means for engaging said track as said car rolls therealong.

13. The position sensing system of claim 1 additionally comprising second measuring means for determining the length of said flexible member introduced into said kerf and for providing a signal indicative thereof.

14. The position sensing system of claim 13 wherein said second measuring means comprises a wheel for rolling along said flexible member and second encoder means coupled to said wheel to provide the signal indicative of the length of said flexible member.

15. The position sensing system of claim 13 additionally comprising means for recording said support position signals.

16. The position sensing system of claim 15 wherein said first measuring means also provides signals indicating the direction which said apparatus is traveling along said first path.

17. The position sensing system of claim 1 wherein said arm includes more than two sections, each movable relative to another, and wherein said sensor means comprise plural sensors, each associated with a respective pair of sections of said support means, for providing respective signals indicative of the position of the sections of each of said pairs with respect to each other at said selected points along said path.

18. The position sensing system of claim 17 additionally comprising at least one sensor associated with a preselected section of said support means for providing a signal indicative of the position of said section with respect to the ground.

19. The position sensing system of claim 18 additionally comprising second measuring means for determining the length of said member introduced into said kerf and for providing a signal indicative thereof.

20. The position sensing system of claim 19 where each of said signals from said sensor means and said first and second measuring means is provided to translation means for producing output signals suitable for use in generating a graphic representation of the position of said flexible member in the ground.

21. The position sensing system of claim 20 wherein said translation means comprises at least one algorithm translating the geometry of said support sections into data indicative of the position of said flexible member in said plural coordinates.

22. The position sensing system of claim 21 additionally comprising means for recording each of said signals from said sensor means and said first and second measuring means.

23. The position sensing system of claim 19 additionally comprising means for recording said support position signals.

24. The position sensing system of claim 23 additionally comprising alarm means, said alarm means being coupled to said first and second measuring means to provide respective alarm signals when said apparatus has traversed a predetermined distance along said first above ground path and when a predetermined length of said member has been introduced into said kerf, respectively.

25. The position sensing system of claim 24 additionally comprising display means, said display means being coupled to said first and second measuring means to provide respective perceptible displays indicative of the distance said apparatus has traversed along said first above ground path and the length of said member said apparatus has introduced into said kerf, respectively.

26. The position sensing system of claim 23 wherein each of said sensor means comprises an ultrasonic device.

27. The position sensing system of claim 26 wherein said ultrasonic device comprises transmitter means, receiver means, and target means, and wherein said transmitted means and said receiver means are mounted on at least one of said support sections, and said target means is mounted on at least another of said support sections.

28. The position sensing system of claim 1 wherein at least one of said support sections is movable relative to at least another of said support sections via actuatable means.

29. The position sensing system of claim 28 wherein said sensor means comprises transmitter means, receiver means and target means, and wherein said actuatable means comprises a cylinder arranged to have a fluid introduced therein, said cylinder comprising a housing fixedly secured to at least of one said support sections and a movable piston rod fixedly secured to at least another of said support sections, and wherein said target means is fixedly secured to either said piston rod or to said housing and said transmitter means and said receiver means is fixedly secured to either said housing or said piston rod, respectively.

30. The position sensing system of claim 29 wherein each of said sensor means comprises an ultrasonic device.

31. The position sensing system of claim 1 additionally comprising translation means for producing output signals suitable for use for generating a graphic representation of the position of the flexible member in the ground.

32. The position sensing system of claim 31 wherein said translation means comprises at least one algorithm translating the geometry of said support sections into data indicative of the position of said flexible member in said three coordinates.

33. A method for determining the position of an elongated flexible member which is buried in an underground path by apparatus which cuts kerf in the ground and inserts said member therealong as said apparatus traverses a first above ground path adjacent said underground path, said apparatus comprising ground engaging means to cut said kerf and to introduce said member into said kerf, and support means to position said ground engaging means at desired positions as said apparatus is moved along said first path, the position of each portion of said flexible member along said underground path being definable by first, second, and third coordinates representative of the distance along the first path, the lateral distance from said first path, and the depth below said first path, respectively, said support means comprising plural sections which are movable relative to one another to establish the positions for the flexible member in the underground path, said method comprising determining the distance traveled by said apparatus along said first path and providing first signals indicative thereof, sensing the position of at least two sections of said support means to each other and providing support position signals indicative of the position of at least one of said sections with respect to at least another of said sections at selected longitudinal points along said first path as said apparatus traverses said first path and in response to said support position signals providing second and third signals representative of said second and third coordinates, respectively, at each of the selected points whereupon a graphic representation of the position of said elongated flexible member in the ground can be produced.

34. The method of claim 33 additionally comprising recording said signals representative of said coordinates.

35. The method of claim 33 wherein said apparatus comprises a rail car arranged to roll along said path and wherein said support means comprises an arm mounted on said car and comprising said at least two sections and wherein said ground engaging means comprises a plow blade mounted on said arm.

* * * * *